Figure 3:
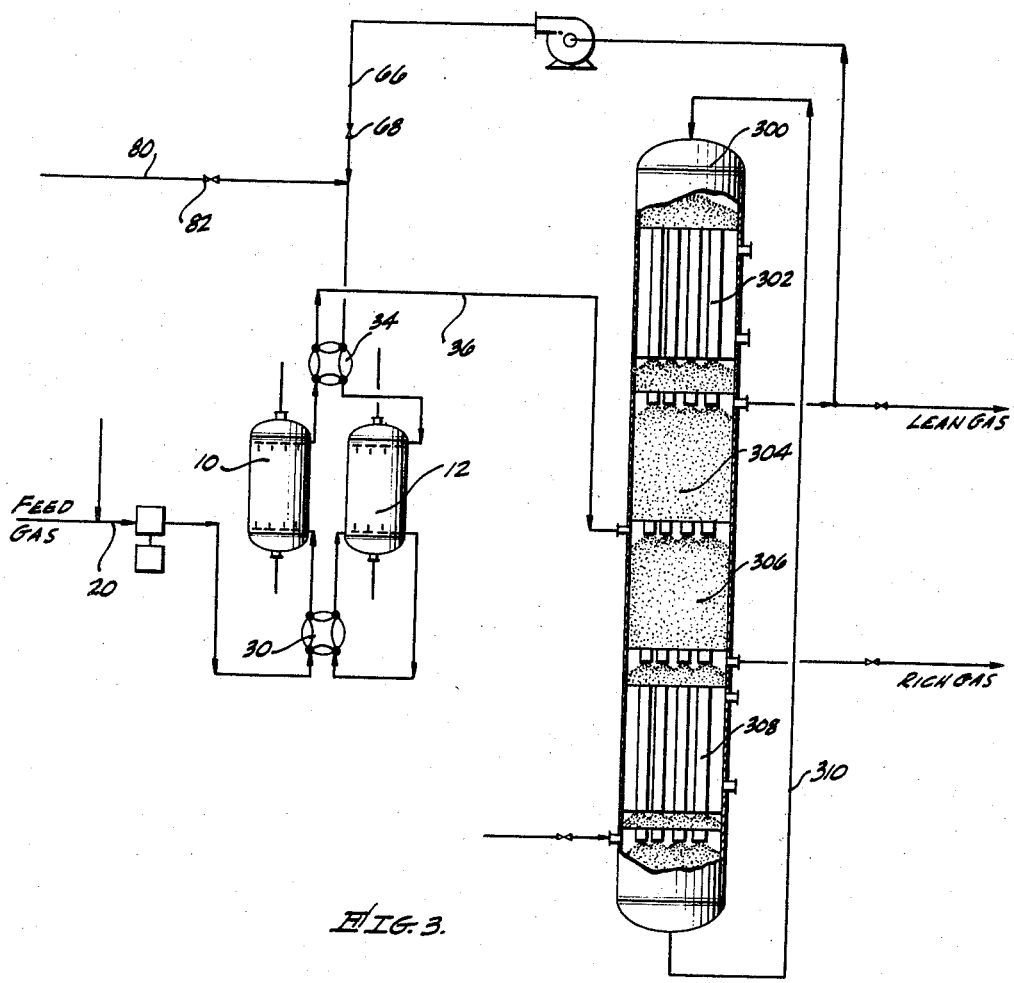

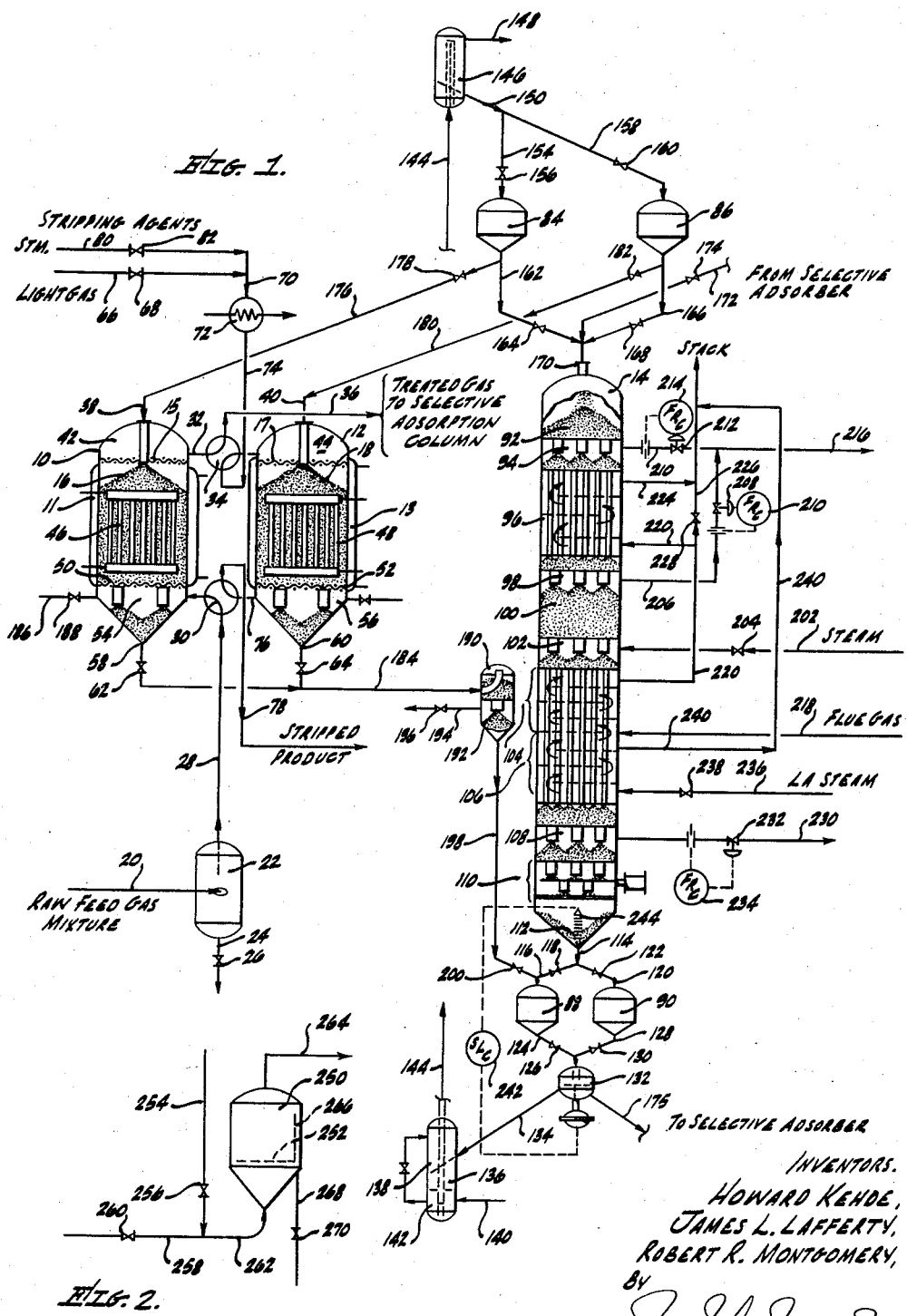

United States Patent Office 2,850,114
Patented Sept. 2, 1958

2,850,114

SELECTIVE ADSORPTION PROCESS

Howard Kehde, Fullerton, James L. Lafferty, Long Beach, and Robert R. Montgomery, Los Angeles, Calif., assignors to Union Oil Company of California, Los Angeles, Calif., a corporation of California Application December 16, 1954, Serial No. 475,774

10 Claims. (Cl. 183—114.2)

This invention relates to an improved selective adsorption process for the adsorptive fractionation of fluid mixtures containing components of differing degrees of adsorbability, and particularly this invention relates to such a process which includes novel steps for the pretreatment of such fluid mixtures to remove the most readily adsorbable components which directly or indirectly cause the ultimate deactivation of the granular adsorbent employed to fractionate the fluid mixture.

In recent years highly important advancements have been made in the development and commercialization of the selective adsorption process for the fractionation of fluid mixtures containing a plurality of constituents which are adsorbed to different degrees by a solid granular adsorbent. This process permits fractionation of such fluid mixtures into one or more fractions thereof in substantially pure form and relatively uncontaminated by constituents desired in any of the other fractions. Whereas the conventional processes of adsorption, extraction, and distillation require extreme operating temperatures as low as —175° F. and pressures as high as 600 p. s. i. g. for the fractionation of fluid mixtures containing the light gases, the selective adsorption process subsequently described is capable of separating the same mixtures at pressures not exceeding about 150 p. s. i. g. (pounds per square inch gauge) and temperatures of up to about 400° F., but is adaptable to operations at considerably higher pressures if the feed gas mixture is available at such pressures.

The selective adsorption process utilizes a recirculated stream of solid granular adsorbent, such as activated coconut shell charcoal, which is passed downwardly by gravity as a dense moving bed successively through an adsorption zone, one or more rectification zones, and a desorption zone. The fluid mixture to be separated is passed countercurrent to the adsorbent through the adsorption zone so as to adsorb the more readily adsorbable constituents forming a rich adsorbent and leaving the less readily adsorbable constituents as an unadsorbed lean gas. The lean gas is removed from the top of the adsorption zone and the rich adsorbent, containing traces only of lean gas constituents, passes by gravity into a rectification zone.

Herein the rich adsorbent is countercurrently contacted with a reflux gas containing constituents of the feed gas mixture which are more readily adsorbable than the traces of lean gas constituents present in the rich adsorbent. These more readily adsorbable constitutents are the higher molecular weight gases in the hydrocarbon series of molecules and are the constituents of higher critical temperature in the group of so-called inorganic gases. Within the rectification zone these more readily adsorbable constituents are adsorbed on the rich adsorbent preferentially desorbing the traces of less readily adsorbable constituents desired in the lean gas forming a rectified adsorbent substantially free of lean gas constituents. The preferentially desorbed materials flow upwardly countercurrent to the adsorbent, enter the adsorption zone whereinto any traces of more readily adsorbable constituents are readsorbed, and the unadsorbed gases join the lean gas product described above.

The rectified adsorbent may be subjected to further rectification with successively more readily adsorbable materials to produce one or more fractions of intermediate adsorbability. Alternatively it may be passed directly to the desorption zone wherein it is heated and stripped of the more readily adsorbable constituents leaving a hot lean adsorbent which is then cooled and recirculated for re-use in the adsorption zone. The desorbed more readily adsorbable constituents are employed in part as the aforementioned reflux gas in the rectification zone in which these materials are adsorbed and returned with the adsorbent to the desorption zone. The remainder is removed as a rich gas product from the desorption zone.

A considerable number of these adsorption processes have been installed and operated at high efficiency to separate ethylene by adsorptive fractionation of a gaseous mixture produced by the high temperature treatment of hydrocarbon liquids and gases. Such gases contain methane and sometimes hydrogen, saturated and unsaturated hydrocarbons having two and three carbon atoms per molecule, and in addition one or more kinds of olefinic, diolefinic and/or acetylenic hydrocarbons having four or more carbon atoms per molecule are often present. These unsaturated higher molecular weight materials are among the more readily adsorbable constituents of such gaseous mixtures. They are exceedingly sensitive to temperatures above about 200° F. at which they readily polymerize to form polymers having eight, twelve, or more carbon atoms per molecule in the pore spaces of the adsorbent. Such polymers have very low adsorbed phase vapor pressures, they are tenaciously held in the pore spaces of the adsorbent due to their great molecular weight, and thus they are virtually impossible to remove therefrom by the ordinary stripping methods. Such polymerization occurs at temperatures above about 200° F., a temperature which is lower than those conventionally employed in the desorption zone of the selective adsorption system referred to above and in which a major portion of the adsorbed constituents are readily removed from the adsorbent. Ultimately adsorbent deactivation (adsorption capacity decrease) results from the fractionation of gaseous mixtures containing such polymerizable hydrocarbons due to the formation of these polymeric substances on the adsorbent.

Adsorbent deactivation may also result from the accumulation of high molecular weight difficultly desorbable hydrocarbons in the fractionation of saturated or paraffinic gaseous mixtures of hydrocarbons. Frequently such gaseous mixtures contain traces of solvents such as absorption oils employed in prior treating steps and which have molecular weights of the order of 175. These materials if present in the feed gas accumulate on and deactivate the adsorbent as do the polymeric materials discussed above.

These and other higher molecular weight more readily adsorbable materials eventually accumulate on the adsorbent in spite of the fact that 99.9% or more of the adsorbed materials are readily removed from the adsorbent in the main desorption zone. Because of their great molecular weight the adsorptive force holding them in the adsorbed phase in the adsorbent is very high. Because of their low vapor pressure even at desorption temperatures they have exceedingly low partial pressures in the desorption zone and are thus not completely desorbed even though there is an absolutely complete removal of the lower molecular weight materials.

It has been previously the practice to pretreat such gaseous mixtures in an oil absorber to remove a substantial proportion of any higher molecular weight constituents which tend to accumulate on and deactivate the adsorbent. Such a treatment is particularly effective but invariably leaves traces of adsorption oil in the thus treated gas which also has a deactivating effect. With unsaturated stocks the improvement is not so great because the unsaturated $C_4$ hydrocarbons are not usually absorbed completely and the remaining $C_4$ hydrocarbons polymerize and deactivate the adsorbent at desorption temperatures.

Accordingly it was suggested by Soddy in 1922, U. S. Patent No. 1,422,007, that a gaseous mixture, contaminated with materials which tend to deactivate the adsorbent, be contacted successively with two or more masses of solid granular adsorbent. The higher molecular weight or otherwise more readily adsorbable contaminants are adsorbed from the gaseous mixture in a primary stage to prevent accumulation of these materials on the adsorbent employed in a secondary adsorption stage. In such a process, the gas to adsorbent ratio is lower in each successive contacting stage whereby the very high molecular weight contaminants only are adsorbed in the preliminary adsorption stage. The purified gas mixture is then fractionated in a second adsorption stage.

Soddy disclosed two modifications of processes for effecting these gas-adsorbent contacts, one using a static bed of adsorbent which was intermittently operated, and a continuous process which employed a moving bed of adsorbent which was recirculated through an adsorption zone. In either case the purpose of the preliminary adsorption was to preadsorb in a relatively small amount of adsorbent the heavy contaminants from the gaseous mixture and prevent the more or less permanent deactivation of the large masses of adsorbent employed in the subsequent contact.

Another system for overcoming this adsorbent deactivation in a moving bed selective adsorption process is to continuously or intermittently remove from the adsorbent cycle a relatively minor portion of the adsorbent and subject it to stripping temperatures in excess of those employed in desorbing the rich gas from the rectified gas in the desorption zone. This stripped adsorbent is then further heated to temperatures above about 1000° F. in contact with a gas containing steam to reactivate the adsorbent. It is then returned to the main adsorbent cycle.

In either of the foregoing processes certain disadvantages have been noted. In the preliminary adsorption of the contaminated gaseous mixture the contaminants are accumulated on an adsorbent which is deactivated and which therefore must then be discarded. If it is discarded the economic loss is as great or greater than that resulting from a continuous reactivation of the adsorbent. If the adsorbent is reactivated by withdrawing a minor portion of the recirculated adsorbent stream there is invariably a relatively small adsorbent loss during the reactivation. Because of the passage of the rectified gas containing the adsorbed deactivating materials through the desorption zone, a substantial proportion of these materials polymerize during passage of adsorbent through the desorption zone in the selective adsorption column and further increases the load on the reactivation zone. Furthermore the activity level or adsorption capacity of all the adsorbent in the selective adsorption process is lower because the deactivants present rise to an equilibrium value dependent upon the rates of accumulation and reactivation. If preadsorption is employed, the activity level of the adsorbent remains at its maximum.

The present invention is accordingly directed to an improved selective adsorption process which is free of the aforementioned disadvantages and which through a series of specific operating steps, effected in the apparatus to be described below, the adsorbent employed in the selective adsorption process is substantially completely protected from the adverse effects of constituents which tend to accumulate on the adsorbent. This result is achieved with reactivation heat and steam requirements and adsorbent losses which are between about 5% and about 20% of those encountered in either the preadsorption or reactivation systems referred to above.

It is therefore a primary object of the present invention to provide a combination selective adsorption process for fluid mixture fractionation which is capable of handling and fractionating such mixtures containing substantial amounts of highly adsorbable adsorbent deactivating materials.

It is a more specific object of the present invention to provide in combination with the selective adsorption process an improved fluid mixture preadsorption and adsorbent reactivation system in which the deleterious contaminants present in the fluid mixture are preadsorbed on an adsorbent in a preliminary adsorption system to produce a gas free of such deactivants which is fed to the selective adsorption system, and wherein the preadsorbed contaminants are substantially completely recovered at low temperatures without loss, with substantially reduced adsorbent deactivation, and with less than 10% of the adsorbent loss due to reactivation treatments employed heretofore.

It is a more specific object of this invention to provide a highly efficient preadsorption and adsorbent reactivation treatment for a gaseous mixture fed to the selective adsorption process in which the raw gaseous mixture is passed intermittently in one direction through a primary bed of adsorbent in alternation with a flow of a stripping gas passed through the primary bed of adsorbent in the opposite direction at temperatures less than about 200° F. whereby the adsorbent deactivating materials are concentrated primarily in one end only of the primary bed of adsorbent, periodically stripping the primary adsorbent bed with steam at temperatures ranging between the saturation temperature of the steam and about 600° F. in the same direction as the stripping gas, thereafter removing that portion of the primary adsorbent bed containing the concentrated deactivants, introducing reactivated adsorbent at the opposite end of the primary adsorbent bed, subjecting the removed portion of the adsorbent successively to indirect heating and steam stripping at temperatures up to about 1000° F., contacting the thus stripped adsorbent with steam at temperatures between about 1000° F. and about 2000° F., and ultimately returning the thus reactivated adsorbent to the bed of primary adsorbent to pretreat further quantities of the gaseous mixture.

Other objects and advantages of the present invention will become apparent to those skilled in the art as the description thereof proceeds.

Briefly the present invention comprises an improved selective adsorption process for the fractionation of a raw fluid mixture containing constituents which directly, because of their high molecular weight, or indirectly, because of the chemical constitution as precursors of such high molecular weight materials, result in the formation of heavy deactivating compounds which are difficultly desorbable from the adsorbent pore space and accordingly deactivate the adsorbent by reducing its adsorption capacity. The raw feed gas is first passed upwardly through a bed of solid granular adsorbent contained in a primary or pretreating zone. Preferably a plurality of such pretreating zones are employed in alternation, each containing a bed of solid granular adsorbent. The higher molecular weight materials which cause adsorbent deactivation are adsorbed leaving a pretreated feed gas mixture substantially free of the adsorbent deactivating materials. This pretreated feed gas is then introduced into the main selective adsorption system wherein the gaseous mixture is contacted with a downwardly moving bed of solid granular adsorbent to effect the fractionation of the mixture.

The main selective adsorption system comprises a vertically disposed adsorption column through which a solid granular adsorbent is circulated downwardly by gravity successively through an adsorbent cooling zone, an adsorption zone, one or more adsorbent rectification zones, and a desorption and stripping zone. The adsorbent removed from the bottom of the column is conveyed by any suitable means to the top thereof and is reintroduced into the column. Depending upon the number of rectification zones employed and the number of constituents present in the pretreated gaseous mixture, two or more substantially pure fractions of the mixture may be produced from the main selective adsorption system and substantially no activity decline results because of the prior removal in the primary adsorption zones of the adsorbent deactivating materials even though this adsorbent is continuously recirculated through a desorption and stripping zone which is operated at temperatures as high as 500° F. If desired, an adsorbent reactivator may be operated in parallel with the main selective adsorption column. Ordinarily this is not necessary however.

The primary adsorption or guard zones are employed in sets of two or more, at least one of which is always treating the raw gaseous mixture while the others are being heated, stripped, and cooled to effect the removal of substantially all the adsorbed deactivants. It has been found that reductions of up to about 95% in heat and steam requirements, relative to the requirements previously involved in adsorbent reactivation, are achieved in the process of the present invention by passing the raw gaseous mixture through the primary adsorption zone in one direction when that zone is on stream and passing the stripping gas through that zone in the opposite direction when the zone is being stripped. For example, it is preferred that the raw feed gas be passed upwardly through the primary adsorbent and the stripping gases passed downwardly therethrough.

During the initial gaseous mixture flow through the primary adsorption zone, the body of adsorbent rapidly adsorbs an amount of each of the constituents present in the raw gaseous mixture. As the flow continues the higher molecular weight adsorbent deactivating materials are preferentially adsorbed and simultaneously effect a preferential desorption of the less readily adsorbable materials. For example in a cracked hydrocarbon mixture of gases containing hydrogen, methane, and saturated and unsaturated hydrocarbons having two to six carbon atoms per molecule and in which the $C_4$ and heavier hydrocarbons are desirably retained in the primary adsorption zone, the primary adsorbent is initially saturated with all these constituents. As the flow continues and further quantities of $C_4$ and heavier hydrocarbons enter with the raw gaseous mixture, these heavier hydrocarbons are preferentially adsorbed thereby preferentially desorbing $C_3$ hydrocarbons and less readily adsorbable materials which leave the primary adsorption zone in the gas phase and are passed to the main selective adsorption system with the treated gas. After further continued operation, sufficient of these heavy hydrocarbons have been adsorbed to preferentially desorb nearly all but an equilibrium amount of the $C_3$ hydrocarbons and less readily adsorbable materials so that the adsorbent can adsorb no further $C_4$ hydrocarbons. Further introduction of feed gas results in the preferential adsorption of $C_5$ and heavier hydrocarbons which will if continued, cause preferential desorption of $C_4$ hydrocarbon thereby reintroducing into the gas mixture these undesired constituents which would then pass into the main selective adsorption system. At this point, the raw gaseous mixture fed to this particular primary adsorption zone is discontinued and is then turned into another primary adsorption zone in which the same process is repeated until the $C_4$ hydrocarbons are about to "break through" and contaminate the pretreated gas mixture.

After the raw gas has been passed through a given bed of primary adsorbent until the undesired constituents have or are about to break through, it has been found that there is within the thus treated primary adsorbent bed a concentration gradient from the treated gas outlet toward the raw gas inlet of successively higher molecular weight constituents in which the concentration of the highest molecular weight materials is greatest at the feed mixture inlet and least at the treated feed outlet end of the primary adsorbent bed.

This particular primary adsorption zone is, according to the present invention, depressured from the operating pressure by bleeding fluids therefrom into the intake lines to the feed gas compressors. The heavy deactivants remain adsorbed and a substantial part of the light components desired in the feed to the main selective adsorption column are evolved and mixed with the raw gaseous mixture flowing into the other primary adsorption zone. Applying a vacuum further facilitates light component removal from the primary adsorbent. The primary adsorbent is not heated during this step because it causes liberation of undesirable deactivants into the raw feed gas. In this process the depressuring of the gas phase and the light component desorption from the primary adsorbent cause the adsorbent temperature to drop several degrees by endogenous cooling effects and aid in retaining the deactivants.

The depressured primary adsorbent is then contacted with a reverse flow of a stripping gas, such as the lean low molecular weight unadsorbed gas from the main selective adsorption system or low pressure steam, which is passed through the primary adsorption zone in the opposite direction to that of the raw feed gas. If the feed gas were passed upwardly through the primary adsorbent as in the example above, this low molecular weight stripping gas is passed downwardly therethrough. The effect of this stripping gas flow is to reduce the partial pressure of all the adsorbed constituents in the gas phase thereby effecting a desorption of the adsorbed constituents to produce a gas mixture which carries out the $C_4$ and higher molecular weight constituents in the reverse direction. There apparently results a reverse migration of the higher molecular weight contaminants through the primary adsorbent bed toward the raw feed gas inlet, which in this example is the bottom of the primary adsorption zone, and this increases the concentration gradient described above. The migration of $C_5$ hydrocarbons for example effects a preferential desorption of $C_4$ hydrocarbons in the lower portion of the bed, these are carried out with the stripping gas, and the $C_5$ hydrocarbons are readsorbed at a lower point in the primary adsorbent bed.

Ultimately, under this lean stripping gas treatment, most of the adsorbed deactivants are desorbed and carried out of the primary adsorbent except the very heavy material which migrates to and is retained in approximately the lower 10% of the primary adsorbent at the bottom of the primary adsorption zone. If desired, during this reverse stripping gas treatment, the primary adsorbent may be directly or indirectly heated moderately by means of a jacketed shell and/or internal tubes to temperatures below those at which thermally sensitive adsorbed deactivants begin to polymerize. For the highly unsaturated hydrocarbon gases having four or more carbon atoms per molecule this temperature is about 180° F. at atmospheric temperature.

After termination of the lean stripping gas treatment and cooling of the adsorbent, this primary adsorption zone is placed on stream again contacting the raw feed gas mixture which is passed upwardly therethrough and the process is repeated until the undesired constituents are about to or do break through to the main selective adsorption system. If desired, the warm primary adsorbent may be directly cooled by the raw feed gas.

Then the lean stripping gas treatment is repeated by passing the lean gas in the reverse direction to remove the lower molecular weight contaminants and to concentrate further the higher molecular weight difficultly desorbable contaminants at the lower part of the primary adsorption zone.

Depending upon the quantity and the quality of the undesired contaminants, the alternate raw gas contact and the lean stripping gas contact may be continued for as many as three to ten or more cycles at which time a sufficient quantity of the difficultly desorbable contaminant accumulates adjacent the raw feed gas inlet of the primary adsorption zone. At this time, if desired, following the last lean gas stripping contact the primary bed of adsorbent is contacted in the same stripping gas direction with a stripping gas such as steam at a temperature between about 200° F. or the saturation temperature for steam which depends upon the stripping pressure, and about 600° F. to remove further quantities of the contaminants which are not desorbed by the lean stripping gas. Usually with this treatment a sufficient quantity of the deactivants are removed to permit the primary adsorbent to be placed back on stream contacting further quantities of raw feed gas mixture and the alternate raw gas contacts and lean stripping gas contacts may be repeated.

Ultimately however the 10% to 20% portion of the primary adsorbent adjacent the raw gas inlet in the primary adsorption zone becomes sufficiently deactivated with concentrated deactivants that further operating according to the above steps is unwarranted. Then either one of two adsorbent reactivation procedures may be followed. In the first the primary adsorbent bed is static and the spent portion of the adsorbent is periodically removed and replaced with an equal volume of reactivated and/or new adsorbent. In the second modification the adsorbent may be removed continuously from adjacent the raw gas inlet for reactivation and replaced with reactivated and/or new adsorbent adjacent the treated gas outlet at an equal rate. In this latter modification the primary beds of adsorbent are moving at a rate sufficient to carry the less readily desorbable deactivants to the reactivator.

In the first modification a minor portion of the primary adsorbent, containing the highest concentration of adsorbed deactivants, is removed from the primary adsorption zone from a point adjacent the raw gas inlet. It is replaced by an equal volume of reactivated adsorbent at a point adjacent the treated gas outlet, and the primary adsorption zone operation with a static primary adsorbent bed is continued as above described. The foregoing alternate feed and low temperature stripping gas contact steps result in the production of a relatively small stream of quite thoroughly deactivated adsorbent which, in the present invention, is reactivated in a reactivation zone which is operated in conjunction with the primary adsorption or guard zones.

In the other modification the alternate raw feed gas and stripping gas contacts are effected in the same specific relative directions, but the deactivated adsorbent is continuously withdrawn at the raw feed inlet and replaced with reactive adsorbents at the heated gas outlet at a rate controlled to keep the undesired deactivants from breaking through into the treated feed gas mixture, and the deactivated adsorbent stream is reactivated.

In either modification the quantity of this deactivated adsorbent has been found to be only about 5% to 20% of that which must be reactivated when the primary adsorption or guard zones are not employed and when a portion of the adsorbent in the main adsorption system must be removed therefrom for reactivation. This is apparently due to the fact that in this invention the primary adsorbent is not subjected to temperatures above about 200° F. whereas the adsorbent in the main selective adsorption stream is subjected to such temperatures in the normal course of producing the rich gas product in the stripping and desorption zone therein. The specific procedure of passing the raw gas mixture and the lean stripping gas through the primary adsorption zones in opposite directions thereby causing the deactivant to concentrate in one portion only of the primary adsorbent also has been found to effect a further and substantial reduction of the volume of deactivated adsorbent which must be reactivated.

The deactivated adsorbent from the primary adsorption zones is collected and is introduced continuously or intermittently into a high temperature stripping and adsorbent reactivation system through which the deactivated adsorbent is circulated. This adsorbent is steam treated at elevated temperatures to either strip the deactivants from the adsorbent or to gasify them and remove them as decomposition products to produce a reactivated adsorbent which is returned, either intermittently or continuously, to the various primary adsorption zones as described to replace deactivated adsorbent removed therefrom.

The adsorbent reactivation system of this invention includes the circulation of the deactivated adsorbent successively through a high temperature stripping zone operating at temperatures above those at which the rich gas is desorbed from the adsorbent in the main selective adsorption system but below about 1000° F., such as between about 500° F. and 1000° F., then through a reactivation zone in contact with steam at temperatures of about 1000° F. and 2000° F. in which residual non-desorbable contaminants are thermally and chemically decomposed to produce volatile decomposition products, and then through a cooling zone in which the partially reactivated adsorbent is cooled to a temperature substantially equal to that of the high temperature stripping zone. The partially reactivated adsorbent is recirculated for repassage through the aforementioned zones. The recirculation of the partially reactivated adsorbent is continued until the adsorbent activity is increased sufficiently for use as a preadsorbent in the primary or guard zones. This reactivated adsorbent is collected from the reactivation system and returned as described to replace the deactivated adsorbent removed from the primary adsorption zones.

It should be understood that a principal advantage of reactivating the adsorbent removed from the primary adsorption zones rather than reactivating a slip stream from the main selective adsorption system is found in the fact that the quantity of adsorbent from the primary adsorption zones which must be reactivated is only about 5%–20% of that which must be reactivated in the main selective adsorption system, and the operating activity level in the latter system increases substantially. Accordingly the size of the reactivation equipment and the required quantities of heat and steam have been substantially reduced. This advantage results from the concentration of the deactivants in only a small part of the primary adsorbent by the specific reverse flow directions of raw gas and lean stripping gas described above and the absence of primary adsorbent stripping temperatures above about 200° F.

The present invention will be more readily understood by reference to the accompanying drawings in which:

Figure 1 shows a schematic flow diagram and a detailed elevation view in cross section of the principal vessels of the pretreating and adsorbent reactivation process of this invention, Figure 2 shows schematically a modified form of the high temperature reactivator, and Figure 3 is a schematic process flow diagram showing the pretreating system and the main selective adsorption system.

Figure 1 will be described in terms of a specific example in which the process of the present invention is applied to a selective adsorption process employing activated coconut shell charcoal as the adsorbent to fractionate a cracked hydrocarbon gas mixture containing ethylene and acetylene in substantial quantities and which is contaminated with di-olefinic and acetylenic hydrocarbons having four or more carbon atoms per molecule to produce a $C_2$ hydrocarbon concentrate consisting essentially of ethylene and acetylene.

With reference to the following description of the drawings it must be understood that the conditions of temperature and pressure, the compositions of the fluid streams, and the specific type of adsorbent described therein are intended to be illustrative only and not to limit the application of the present invention to the specific conditions and fluid mixtures described. The same principles outlined above may be applied to other fluid mixtures which contain very readily adsorbable and difficultly desorbable contaminants which tend to accumulate on and deactivate the adsorbent either because of their high molecular weight or because of their sensitivity to the temperatures employed to strip the adsorbent and at which they polymerize or otherwise react to form difficultly desorbable materials on the adsorbent.

Referring now more particularly to Figure 1, a schematic flow sheet of the process of the present invention is shown in which two of a plurality of primary adsorption or guard chambers 10 and 12 are employed in conjunction with a reactivation column 14. A primary bed of granular solid adsorbent 16 and 18 is maintained in each of the primary adsorption vessels 10 and 12. As described above in greater detail these primary beds are either continuously or intermittently moved so as to pass a portion of the adsorbent through reactivator 14. In the following discussion the intermittent movement is assumed, although the identical apparatus can be utilized when the primary adsorbent beds are continuously in motion.

A raw feed gas mixture is compressed to between about 60 p. s. i. g. and about 150 p. s. i. g. by feed gas compressors not shown and is introduced through line 20 into knockout drum 22 at a rate of 332 MSCF (thousand standard cubic feet) per day and has the following composition:

TABLE I

*Raw feed gas composition*

| Component: | Volume percent |
|---|---|
| Hydrogen | 35.7 |
| Carbon monoxide | 6.8 |
| Methane | 16.6 |
| Carbon dioxide | 14.7 |
| Ethylene | 15.7 |
| Acetylene | 8.6 |
| Ethane | 0.5 |
| Propylene | 0.6 |
| Methyl acetylene | 0.5 |
| Di acetylene | 0.1 |
| Vinyl acetylene | 0.2 |
| Butadiene | 0.3 |
| Butenes | 0.1 |
| $C_5+$ hydrocarbons | 0.2 |
| | 100.0 |

The unsaturated portion of the $C_4$ hydrocarbon fraction in the raw feed gas has been found to have a deleterious effect on the adsorbent if the adsorbent containing these constituents is heated to temperatures above about 200° F. Accordingly it is desired to preliminarily adsorb the $C_4$ and higher molecular weight hydrocarbons prior to introducing the $C_3$ and lower molecular weight constituents of the raw gas into the selective adsorption process.

Any entrained liquids in the raw feed gas mixture are separated therefrom centrifugally in knockout drum 22 and are removed intermittently or continuously through line 24 controlled by valve 26. The raw feed gas is then passed through line 28 through four-way valve 30 into first primary adsorption zone 10 from which the unadsorbed contaminant free gas is removed through line 32 controlled by four-way valve 34 and sent through line 36 at a rate of 328 MSCF per day to the selective adsorption column not shown.

The composition of the pretreated gas produced from the primary adsorption zones and charged to the main selective adsorption system is given in Table II.

TABLE II

*Pretreated gas composition*

| Component: | Volume percent |
|---|---|
| Hydrogen | 35.7 |
| Carbon monoxide | 6.9 |
| Methane | 16.9 |
| Carbon dioxide | 15.0 |
| Ethylene | 15.8 |
| Acetylene | 8.6 |
| Ethane | 0.4 |
| Propylene | 0.4 |
| Methyl acetylene | 0.3 |
| Di acetylene | -- |
| Vinyl acetylene | -- |
| Butadiene | -- |
| Butenes | -- |
| $C_5+$ hydrocarbons | -- |
| | 100.0 |

Thus it is seen that the primary adsorbent effectively removes the butadiene and other polymerizable $C_4$ and heavier hydrocarbons from the raw gaseous mixture.

As noted in the drawing, the primary adsorption vessels 10 and 12 are substantially identical and are provided respectively with heat exchange jackets 11 and 13, upper solids inlets 38 and 40, pretreated gas disengaging and stripping gas engaging zones 42 and 44, adsorbent heating and cooling means 46 and 48, fluid permeable adsorbent supporting trays 50 and 52, raw feed gas engaging and stripping gas disengaging zones 54 and 56, and deactivated adsorbent outlets 58 and 60 controlled respectively by valves 62 and 64.

With four-way valves 30 and 34 in the positions shown, the raw feed gas is introduced into engaging zone 54, passes upwardly through perforated adsorbent support tray 50, and continues upwardly through the first primary adsorbent bed 16. At the same time the second primary adsorption vessel is being depressured and automatically cooled to recover $C_3$ and lighter hydrocarbons, and then contacted with a stripping agent consisting of either a light gas, such as the lean unadsorbed gas from the selective adsorption zone, or low pressure steam. The light gas is introduced through line 66 at a rate controlled by valve 68 and continues through line 70 through heater 72 wherein it is heated to a temperature of about 180° F. When steam is substituted it is introduced through line 80 controlled by valve 82 and passes through line 70 also. The warm stripping gas then passes through line 74 and four-way valve 34 into the upper vapor space of second primary adsorption vessel 12. The stripping gas passes downwardly through the static bed of adsorbent and emerges in disengaging zone 56 from which it and desorbed constituents from the adsorbent are removed through line 76 controlled by four-way valve 30 and continues through line 78 to cooling and condensing facilities or any other desired disposition not shown. Periodically, as described above, superheated steam is employed as the stripping gas and it is introduced at a rate of 15,000 pounds per hour through line 80 controlled by valve 82.

In the present example the primary adsorption zones contain 30,000 pounds of activated coconut shell charcoal having a Tyler mesh size of about between four and ten, the vessels are 8 feet in diameter and 32 feet in height. The primary beds of adsorbent are supported therein on perforated trays 50 and 52 respectively which comprise a lower steel subway grating grid about two inches thick, a coarse screen having a mesh size of about 0.5 inch is superimposed on the grid, and a fine screen having a mesh size of about 12 is superimposed above the coarse screen. An upper fine 12 mesh screen 15 and 17 is positioned above the solids beds and below the top gas connections to prevent adsorbent carry-over. The reactivated adsorbent is introduced downwardly through inlets 38 and 40 which extend through these screens.

Prior to contacting the adsorbent with a downflow of stripping gas, the vessel is depressured from the operating to about atmospheric pressure by discharging gas via lines 186 or 187 into the feed gas compressor intake. This effects a desorption of equilibrium amounts of $C_1$ and $C_2$ hydrocarbons adsorbed on the primary adsorbent. It also cools the primary adsorbent about 10°–20° F. and serves to retain the adsorbed deactivants thereby preventing a recycling of deactivants from one primary adsorber to another. Although this depressuring gas flow can be removed at the top of primary adsorber vessels by a line not shown, preferably lines 186 or 187 are used because this further increases the deactivant gradient.

After the depressuring step, the adsorbent therein may be heated by means of jackets 11 and 13, and/or internal means 46 and 48 to a temperature of about 180° F. thus raising the vapor pressure of the adsorbed constituents and facilitating their desorption. Following the stripping step, a cooling medium is turned through means 11 and 13 and/or 46 and 48 and the adsorbent is cooled to atmospheric temperature so as to increase the adsorbents capacity for the $C_4+$ hydrocarbon contaminant. The raw feed may be turned through the adsorbent to effect this cooling also.

One of the principles of the present invention as indicated above involves the passage of the raw feed gas in one direction through the primary adsorption zones alternately with the passage of a stripping gas in the reverse direction through the same zone. The preferred method is shown in the drawing in which an upflow of feed gas and downflow of stripping gas is employed. This is preferable because during feed gas contact a relatively low feed gas velocity is desirable to obtain complete contaminant adsorption, and during desorption a relatively high stripping gas velocity is desirable to further sweep the contaminants from the adsorbent. The modification shown permits these high stripping gas velocities downwardly through the bed at velocities considerably in excess than those which could be maintained in the reverse direction without lifting the adsorbent and carrying it out of vessels 10 and 12. However, if desired, the reverse modification may be employed, that is, wherein a downward flow of feed gas and an upward flow of stripping gas are utilized. This modification is also preferred because it permits ready intermittent or continuous removal by gravity of adsorbent for reactivation.

In the present example with the feed gas described in Table I, two guard zones are employed. The raw feed gas is passed through each guard chamber for a period of eight hours followed by the passage of lean gas at a rate of 230 MSCF per day for a period of eight hours which includes the heating and cooling time, and then the feed gas is turned through it again. This alternate feed gas and lean stripping gas contact in each zone is continued for six complete cycles after which the primary adsorbent is heated to a temperature of 500° F. and steam at a temperature of 550° F. is turned through the primary adsorbent bed at a rate of 15,000 pounds per hour to further strip the adsorbent. Lean gas at 550° F. may be used if desired, but recovery of desorbed materials is more difficult. This high temperature treatment permits a series of six further feed gas and lean stripping gas cycles to be effected in each of the primary adsorption zones prior to removing the concentrated deactivated adsorbent from the lower portion of the adsorbent beds 16 and 18 for reactivation.

During the primary adsorbent stripping steps, it has been found that the alternate low temperature strippings effectively remove the unsaturated $C_4$ hydrocarbons, but that the benzene and other $C_6$ hydrocarbons are only partly desorbed. The higher temperature stripping step periodically effected, using temperatures of up to about 600° F. removes these $C_6$ to $C_{10}$ hydrocarbon deactivants, but any polymeric or other high molecular weight materials such as $C_{12}$ to $C_{15}$ and heavier hydrocarbons remain. These are the permanent deactivants which are removed in the reactivation steps described below.

The primary adsorbent reactivator employed in the present application of this invention is a column 20 inches in diameter and 40 feet in height and whose holdup is 2000 pounds of the six to ten mesh granular charcoal whose capacity is 400 pounds of charcoal per hour. This reactivator 14 is provided with first upper surge vessel 84 and second upper surge vessel 86, first lower surge vessel 88 and second lower surge vessel 90. The deactivated granular adsorbent is circulated from the bottom of one of the lower surge vessels to the top of and through one of the upper surge vessels and then downwardly into and through reactivator 14 and then downwardly back into and through one of the lower solids surge vessels 88 and 90. The volumes of the upper and lower surge vessels are such that each can hold about 3200 pounds of the six to ten mesh primary adsorption zone charcoal, the maximum total charge to the reactivator system is 6400 pounds, the minimum charge being the 2000 pounds necessary to fill reactivator column 14.

The reactivator column 14 is provided at successively lower levels therein with hopper zone 92, secondary stripped gas disengaging zone 94, heating and primary stripping zone 96, secondary stripped gas disengaging zone 98, secondary stripping zone 100, stripping gas engaging zone 102, heating and reactivation zone 104, adsorbent cooling zone 106, spent regeneration gas disengaging zone 108, adsorbent feeding zone 110, and lower solids accumulation zone 112.

The partially regenerated adsorbent is discharged from zone 112 through outlet 114 and flows either through line 116 controlled by valve 118 into zone 88 or through line 180 controlled by valve 122 into zone 90. The adsorbent then passes either through line 124 controlled by valve 128 or through line 128 controlled by valve 130 into and through adsorbent circulation control valve 132 from which it passes at a rate of 400 pounds per hour through line 134 into solids inlet zone 136 in the upper part of induction chamber 138.

The partially reactivated adsorbent is then picked up as a suspension by a lift gas introduced through line 140 into lift gas inlet zone 142 in the lower part of induction chamber 138. This lift gas passes upwardly from below and through the adsorbent bed maintained in solids inlet zone 136 and is conveyed as a gaseous suspension through lift line 144 and is discharged into a solids lift-gas separator 146. Herein a suspended adsorbent is separated by gravity from the lift gas, the lift gas is recirculated through line 148 to convey further quantities of reactivated adsorbent, and the conveyed adsorbent flows by gravity through line 150 from separator 146 as a downwardly moving bed either through line 154 controlled by valve 156 into upper solids surge vessel 184 or through line 158 controlled by valve 160 into upper solids surge vessel 86. The adsorbent then passes through either line 162 controlled by valve 164 or through line 166 controlled by valve 168 into upper solids inlet 170 at the top of reactivation column 14.

If desired, a stream of adsorbent from the selective adsorption column may optionally be introduced through line 172 controlled by valve 174 into solids inlet 170, and returned to that column via line 175 opening from valve 132.

To permit the replacement of reactivated adsorbent in the primary adsorption vessels 10 and 12 when the lower deactivated portion of the reactant is removed therefrom, line 176 controlled by valve 178 and line 180 controlled by valve 182 are provided communicating surge vessel 84 with first guard chamber 10 and surge vessel 86 with second guard vessel 12 respectively. These lines are employed to introduce reactivated adsorbent into the guard chambers to replace deactivated adsorbent removed therefrom through outlets 58 or 60 respectively.

The subsequent description involves the reactivation of 6400 pounds of deactivated 6-10 mesh coconut shell charcoal over a period of about four days during which time a charge of 3200 pounds of deactivated charcoal is removed from the bottom of each of guard vessels 10 and 12, being replaced by 6400 pounds of reactivated charcoal, and is reactivated and accumulated in upper solids surge chambers 84 and 86 preparatory to being returned to the guard chambers.

Fully activated coconut shell charcoal of six to ten mesh has an activity of 0.480 cc. of adsorption volume per gram. The activity of the deactivated adsorbent in the lower portions of the guard chambers usually is as low as about 0.200 cc. per gram before reactivation in column 14 is necessary. The latter activity value is measured after lean gas and steam stripping, that is, after the series of primary adsorption zone cycles described above. This degree of deactivation for the raw gaseous mixture having the composition given in Table I occurs in about four days.

At the beginning of the reactivation cycle, 3200 pounds of reactivated charcoal are contained in upper surge chamber 84, 1200 pounds are contained in upper surge chamber 86, 2000 pounds are contained in reactivator column 14, and the reactivated adsorbent is being circulated through lift line 144, upper solids surge chamber 86, reactivator column 14, and lower solids surge chamber 90.

A charge of 3200 pounds of deactivated charcoal is removed from the lower part of guard chamber 10 through outlet 58 by opening valve 62 and flowing this charge of carbon through transfer line 184 under the influence of a concurrent flow of conveyance gas such as may be introduced through line 186 at a rate controlled by valve 188. This deactivated charcoal is conveyed as a dense compact phase by means of the concurrent gas flow and maintained in that dense form by restricting the flow of adsorbent from the outlet in separator 190. The adsorbent is discharged into separator zone 190, the conveyance fluid is disengaged from the solids in disengaging zone 192 and removed therefrom through line 194 controlled by valve 196. The 3200 pounds of deactivated carbon are delivered through line 198 controlled by valve 200 into first lower surge zone 88 in a period of about 15 minutes.

Shortly before, during, or shortly after the transfer of deactivated charcoal, valve 178 is opened and the 3200 pounds of reactivated charcoal is transferred through line 176 from first upper surge vessel 84 into first guard chamber 10 to replace the deactivated adsorbent removed therefrom. Thereafter valve 178 is closed and valve 200 is closed.

At the same time these transfers of deactivated and reactivated adsorbent are begun, valve 130 below second lower surge zone 90 is closed causing the 2000 pounds of downwardly moving reactivated adsorbent in reactivator column 14 and the 1200 pounds in second upper surge vessel 86 to accumulate in second lower surge vessel 90. Solids flow control mechanism 110 controls the flow rate of reactivated adsorbent at about 400 pounds per hour. With the commencement of the accumulation of reactivated adsorbent in chamber 90, valve 126 is opened and valve 168 is closed. The solids conveyance rate in lift line 144 is about 1200 pounds per hour and at the end of about three more hours (total elapsed time three hours and fifteen minutes) all of the 3200 pounds of deactivated adsorbent is conveyed to and accumulated in first upper surge vessel 84, second upper surge vessel 86 is empty, and second lower solids surge chamber contains about 1200 pounds of reactivated adsorbent.

At this point the deactivated adsorbent in first upper solids surge chamber 84 is started through the reactivator 14 following the reactivated adsorbent therein at a rate of about 400 pounds per hour and this is continued for a period of five more hours during which time the 2000 pounds of reactivated adsorbent in the reactivator column 14 is accumulated in second lower surge vessel 90. During the last three hours of the five-hour period, this reactivated adsorbent is conveyed through line 144 at a rate of about 1200 pounds per hour and accumulated in second upper surge vessel 86. At the end of this time (total elapsed time eight hours and fifteen minutes) the reactivator vessel is full of 2000 pounds of deactivated adsorbent being passed through the reactivator in its first cycle, 1200 pounds of deactivated adsorbent remains in first upper solids surge chamber 84, and the partially reactivated adsorbent is being circulated from the bottom of reactivator column 14 through second lower surge vessel 90 through lift line 144 and first upper surge vessel 84.

At this time a charge of 3200 pounds of deactivated charcoal is withdrawn from the bottom of second guard chamber 12 through lines 60, 184, and 198 and is injected in about fifteen minutes into first lower surge vessel 88. At about the same time, the 3200 pounds of reactivated adsorbent are dropped from second upper surge chamber 86 through line 180 into the top of second guard chamber 12 replacing the removed adsorbent. The reactivator system now contains a total charge of 6400 pounds of low activity adsorbent, 2000 pounds of which have passed into the reactivator column itself on the first cycle therethrough. The total elapsed time at this point is eight hours and thirty minutes.

The deactivated adsorbent charge is recirculated at a rate of 400 pounds per hour for about five complete cycles, which is equivalent to three days reactivation. To effect the foregoing reactivation, the primary stripping and heating zone 96 is operated to heat the spent charcoal to a temperature of about 950° F. This heated charcoal then passes through secondary stripping zone 100 into which is introduced steam at a temperature of 350° F. and at a rate of 150 pounds per hour through line 202 controlled by valve 204. This steam passes in part upwardly through secondary stripping zone 100 countercurrent to the heated charcoal and the remaining part passes downwardly through the tubes of reactivation and cooling zones 104 and 106 concurrently with the charcoal. The first part of the stripping steam strips the charcoal in the absence of indirect heating in zone 100 and part of the stripped material and stripping steam is removed therefrom through line 206 at a rate of about 40 pounds per hour controlled by valve 208 in accordance with flow recorder controller 210. The remaining part of the stripped material passes upwardly countercurrent to the charcoal in the tubes of primary heating and stripping zone 96 from which it is removed through line 212 at a rate of about 30 pounds per hour controlled by valve 212 in response to flow recorder controller 214. These two streams of stripped materials are joined in line 216 and contain approximately 90% of the desorbable deactivating materials present on the deactivated adsorbent fed to the reactivator. This mixture is sent through line 216 to a suitable vent or to further processing facilities not shown. The deactivated adsorbent is thus stripped of adsorbed materials only during its first passage through zones 96 and 100, little material is recovered later in subsequent cycles.

The stripped adsorbent then passes downwardly through reactivation and heating zone 104 into which flue gas at a temperature of 1600° F. is introduced through line 218 at a rate sufficient to heat the stripped adsorbent to about 1425° F. by indirect heat exchange. The flue gases are removed therefrom through line 220 and are sent in part through line 222 to primary heating zone 96 and in part directly to a stack through line 226 controlled by valve 228. Valve 228 controls the proportion of flue gas from line 220 which flows through heating zone 96, and the flue gas therefrom passes through line 224 to the stack previously described.

The second portion of steam introduced through line 202 as previously described passes downwardly concurrent with the 1425° F. charcoal effecting a water gas reaction which thermally decomposes and gasifies the nondesorbable deactivating materials forming carbon monoxide, carbon dioxide, and hydrogen which passes downwardly and is removed from disengaging zone 228 through line 230 at a rate of about 65 MSCF per day controlled by valve 232 in response to flow recorder controller 234.

Reactivated adsorbent cooling zone 106 is provided to reduce the temperature of reactivated adsorbent to about 1000° F. Low pressure steam or other coolant is introduced through line 236 at a rate of about 500 pounds per hour controlled by valve 238 passing around the tubes of 106 and cooling the charcoal. This gaseous coolant is removed through line 240 and is preferably vented to the stack.

The adsorbent, in a partially reactivated condition, is passed through adsorbent flow control zone 110 provided with a reciprocating tray feeder which volumetrically meters the adsorbent at 400 pounds per hour from the reactivator column. The adsorbent collects in lower hopper 112 for its removal as previously described.

Following approximately five cycles or three days of operation the 6400 pounds of charcoal has been raised in activity from 0.200 cc. per gram to 0.400 cc. per gram and is ready to be returned to the guard chambers 10 and 12 as described.

Referring now more particularly to Figure 2, a schematic flow diagram is shown of a modified batch method for reactivating the adsorbent in which vessel 250 provided with transverse flow distributor 252 is provided in which the adsorbent is maintained at temperatures of the order of 1400° F. as a turbulent fluidized suspension in the presence of steam. Spent adsorbent flows from either a high temperature stripping zone as 96 or from guard chambers 10 and 12 in Figure 6 through line 254 at a rate controlled by valve 256. The adsorbent is picked up by incoming steam in line 258 controlled by valve 260 forming a suspension which passes through line 262 into the bottom of vessel 250. The steam and reactivation products are disengaged from the dense suspended solids phase and are removed via line 264, while at least partially reactivated adsorbent settles in zone 266 and is removed via line 268 controlled by valve 270. If desired, part of this adsorbent may be recycled via line 262 into vessel 250. The recirculation is continued until the adsorbent activity rises sufficiently and then it is removed, cooled, and returned to the primary guard zones. Preliminary high temperatures stripping at about 950° F. is preferably effected prior to increasing the operating temperature to 1400° F. Such a high temperature stripping and reactivation system may be substituted for that shown in Figure 1 if desired.

When the continuous moving bed of primary adsorbent is employed, the charcoal is withdrawn at a rate of about 45 pounds per hour from each of the two primary adsorption zones. A mixture of reactivated and new charcoal is introduced at the same rate into each zone to maintain the moving beds therein.

Referring finally to Figure 3, the pretreating and adsorptive fractionation steps are schematically illustrated. Pretreating zones 10 and 12, detailed in Figure 1, pretreat the raw feed as described and the treated gas flows through line 36 shown also in Figure 1 to the main selective adsorption system. The main selective adsorption system comprises a vertically disposed adsorption column 300 through which a solid granular adsorbent is circulated downwardly by gravity successively through an adsorbent cooling zone 302, an adsorption zone 304, one or more rectification zones 306, and a desorption and stripping zone 308. The adsorbent removed from the bottom of the column is conveyed by any suitable means 310 to the top thereof and is reintroduced into the column 300. The fluid mixture to be separated is passed countercurrent to the adsorbent through the adsorption zone 304 so as to adsorb the more readily adsorbable constituents forming a rich adsorbent and leaving the less readily adsorbable constituents as an unadsorbed lean gas. The lean gas is removed from the top of the adsorption zone 304 and the rich adsorbent, containing only traces of lean gas constituents, passes by gravity into a rectification zone 306. Herein the rich adsorbent is countercurrently contacted with a reflux gas containing constituents of the feed gas mixture which are more readily adsorbable than the traces of lean gas constituents present in the rich adsorbent thereby preferentially desorbing the traces of less readily adsorbable constituents desired in the lean gas forming a rectified adsorbent substantially free of lean gas constituents. The rectified adsorbent may be subjected to further rectification with successively more readily adsorbable materials to produce one or more fractions of intermediate adsorbability. Alternatively it may be passed directly to the desorption zone 308 wherein it is heated and stripped of the more readily adsorbable constituents leaving a hot lean adsorbent which is then cooled and recirculated for reuse in the adsorption zone 304. The desorbed more readily adsorbable constituents are employed in part as aforementioned reflux gas in the rectification zone 306. The remainder is removed as a rich gas product from the desorption zone 308.

The selective adsorption process has not been illustrated or described in detail because a simple modification thereof is fully described in volume 42 of the Transactions of the American Institute of Chemical Engineers, pages 665 to 680, and is now well known in the art. The process of the present invention makes possible the adsorptive fractionation of many fluid mixtures which heretofore could not be treated successfully. The preadsorption and adsorbent reactivation process of the invention may be applied to advantage in the pretreatment of the feed stream to adsorptive fractionation processes other than that described in the Transactions, and to those which use other adsorbents.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A method for preventing the deactivation of solid adsorbent employed in a selective adsorption zone for fluid mixture fractionation therein which comprises establishing at least one primary adsorption zone containing a bed of primary adsorbent, alternately passing the raw fluid mixture in one direction through said primary adsorbent bed to adsorb adsorbent deactivants therein leaving a treated deactivant-free fluid mixture for adsorptive fractionation and then passing a stripping fluid through the primary adsorbent in said primary adsorption zone in the opposite direction to desorb the more readily desorbable deactivants whereby the less readily desorbable deactivants are concentrated in that part of said primary adsorbent bed adjacent the fluid mixture inlet, depressuring said primary adsorption zone after termination of said raw fluid mixture flow and prior to the flow of said stripping gas therethrough by withdrawing fluid therefrom in the absence of adsorbent heating so as to cause desorption of a substantial portion of the lighter fluids adsorbed on the primary adsorbent and desired in the treated fluid mixture and to cause the endogenous cooling of said primary adsorbent to retain the deactivants adsorbed thereon, combining the thus desorbed fluids with a fluid stream flowing ultimately into said selective adsorption zone, withdrawing the most highly deactivated part of the primary adsorbent bed from a point adjacent the fluid mixture inlet, replacing the withdrawn adsorbent with a substantially equal amount of active primary adsorbent introduced at the opposite end of said primary adsorbent bed, and reactivating the withdrawn part of primary adsorbent at temperatures substantially above that of said stripping fluid to remove the less readily desorbable deactivants therefrom forming a reactivated primary adsorbent for return to pretreat further quantities of said fluid mixture.

2. A method according to claim 1 wherein the depressured fluid from one primary adsorption zone is passed therefrom during the depressuring and is admixed with the raw fluid mixture and is passed therewith through the other primary adsorption zone into said selective adsorption zone.

3. In a process for the adsorptive fractionation of a raw gaseous mixture wherein a solid granular adsorbent is recirculated downwardly by gravity as a moving bed successively through an adsorption zone, at least one rectification zone, and a desorption zone, a gaseous mixture is passed through said adsorption zone forming an unadsorbed lean gas product and a rich adsorbent, a rich gas product is desorbed from said rich adsorbent, and wherein said adsorbent is subject to deactivation from the accumulation thereon of difficultly desorbable constituents, the improvement which comprises establishing at least a first and a second primary adsorption zone each containing a bed of primary adsorbent, passing said raw gaseous mixture upwardly through said first primary adsorption zone to adsorb the adsorbent deactivants leaving part of the gaseous mixture unadsorbed and deactivant free, then passing said raw gaseous mixture through said second primary adsorption zone while passing a stripping gas downwardly through said first primary adsorption zone at a temperature not exceeding 200° F. to desorb the more readily desorbable deactivants therefrom leaving a partially stripped primary adsorbent, continuing the alternate upward raw gaseous mixture and downward stripping gas contacts in said primary adsorption zones whereby the unadsorbed gaseous mixture is kept deactivant free and the less readily desorbable deactivants are concentrated in the lower part of the primary adsorbent beds, removing a portion of adsorbent from the bottom and replacing a substantially equal volume of active adsorbent at the top of said primary adsorption zone and continuing the alternate gas contacts, heating the thus withdrawn portion of deactivated adsorbent and contacting it with an adsorbent reactivating gas at temperatures substantially above that of said stripping gas to remove therefrom the less readily desorbable deactivants to form a reactivated adsorbent, and returning reactivated adsorbent to the top of one of said primary adsorption zones to replace at least in part a volume of deactivated adsorbent removed from the bottom thereof.

4. A method according to claim 3 in combination with the step of periodically heating said primary adsorbent within said primary adsorption zone to a temperature between about 200° F. and 600° F., passing a stripping gas downwardly therethrough to desorb further more readily desorbable deactivants and further concentrate said less readily desorbable deactivants, and thereafter continuing further alternate gas contacts.

5. A method according to claim 3 wherein said raw gaseous mixture comprises a mixture of cracked hydrocarbons, in combination with the step of continuing the flow of said raw gaseous mixture through each primary adsorption zone only so long as the unadsorbed gaseous mixture removed therefrom is substantially free of $C_4$ and higher molecular weight hydrocarbons.

6. A method according to claim 3 wherein the withdrawn portion of primary adsorbent is reactivated by introducing it into a reactivation zone, passing a stripping gas upwardly therethrough, controlling the velocity of gas flow to maintain a fluidized body of said primary adsorbent therein, raising the temperature to between about 600° F. and about 1000° F. to desorb more readily desorbable deactivants therefrom to partially reactivate said adsorbent, then raising the temperature to between about 1000° F. and about 2000° F. to convert at least part of the residual less readily desorbable deactivants into volatile decomposition products, and continuing the treatment until the activity of said primary adsorbent is substantially restored.

7. A method according to claim 3 wherein said reactivation gas comprises steam.

8. A method according to claim 1 in combination with the step of withdrawing sufficient fluid from said primary adsorption zone so as to generate therein a subatmospheric pressure.

9. A method according to claim 1 wherein said stripping gas comprises a low molecular weight substantially unadsorbed fraction of said fluid mixture produced in said selective adsorption zone.

10. A method according to claim 1 wherein said fluid mixture comprises a raw gaseous mixture containing unsaturated polymerizable hydrocarbons, in combination with the steps of maintaining the temperature of said primary adsorbent at values below about 200° F. during the stripping gas contacts in said primary adsorption zone whereby said polymerizable hydrocarbons are desorbed without substantial polymerization.

References Cited in the file of this patent

UNITED STATES PATENTS

| Number | Name | Date |
|---|---|---|
| 1,661,104 | Barneby | Feb. 28, 1928 |
| 1,934,075 | Lewis | Nov. 7, 1933 |
| 2,083,732 | Moore et al. | June 15, 1937 |
| 2,336,041 | Simpson et al. | Dec. 7, 1943 |
| 2,391,334 | Nicholson | Dec. 18, 1945 |
| 2,548,192 | Berg | Apr. 10, 1951 |
| 2,614,657 | Nicholson et al. | Oct. 21, 1952 |
| 2,630,877 | Berg | Mar. 10, 1953 |
| 2,638,999 | Berg | May 19, 1953 |
| 2,661,808 | Kahle | Dec. 8, 1953 |
| 2,692,656 | Berg | Oct. 26, 1954 |
| 2,722,999 | Bratzler et al. | Nov. 8, 1955 |